Jan. 20, 1942.          H. DEVLIN            2,270,512
                        DOUGH DIVIDER
                    Filed July 18, 1940          4 Sheets-Sheet 1

HENRY DEVLIN
INVENTOR

ATTORNEY

Jan. 20, 1942.　　　H. DEVLIN　　　2,270,512
DOUGH DIVIDER
Filed July 18, 1940　　　4 Sheets-Sheet 2

HENRY DEVLIN
INVENTOR

BY
ATTORNEY

Jan. 20, 1942.   H. DEVLIN   2,270,512
DOUGH DIVIDER
Filed July 18, 1940   4 Sheets-Sheet 3

HENRY DEVLIN
INVENTOR

BY
ATTORNEY

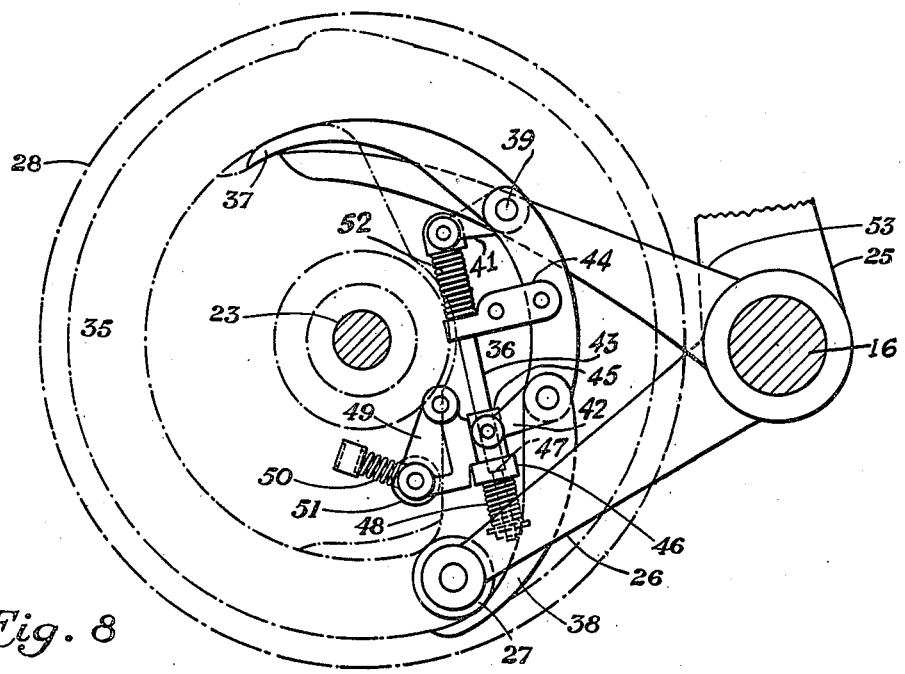
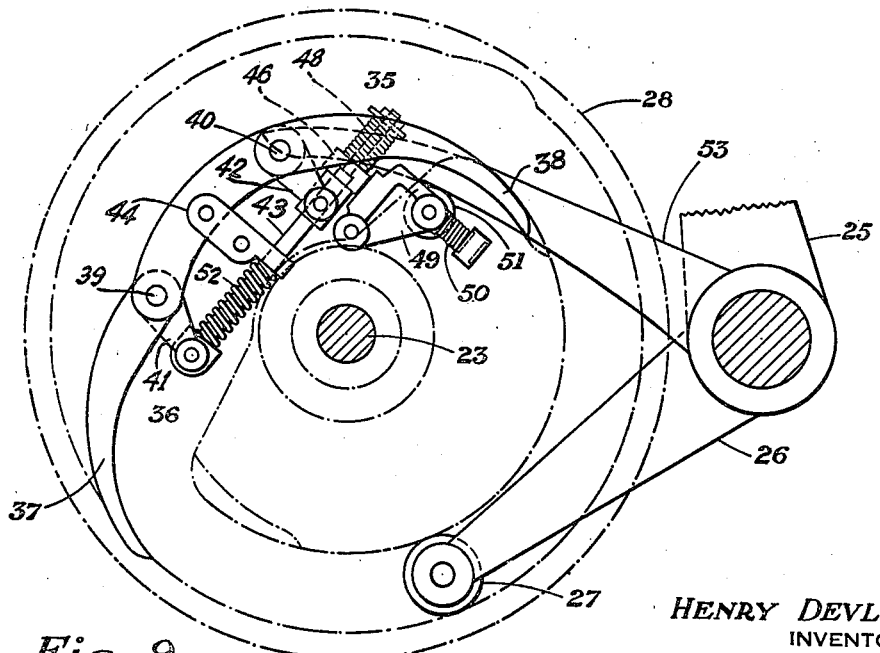

Patented Jan. 20, 1942

2,270,512

UNITED STATES PATENT OFFICE 2,270,512

DOUGH DIVIDER

Henry Devlin, Saginaw, Mich., assignor to Baker Perkins, Inc., Saginaw, Mich., a corporation of New York Application July 18, 1940, Serial No. 346,176

7 Claims. (Cl. 107—15)

This invention relates to fractional dough dividers adjustable to produce measured pieces of various sizes, and more particularly pertains to dividers of this kind which normally operate to sever each full charge of dough in the pressure chambers into a plurality of portions by a succession of operations upon the charge. Its object is to provide an improved machine in which the ram shall draw a relatively large quantity of dough into the compression chamber and then travel forward by successive steps, with periods of rest but no reverse movements between the steps, filling the measuring pocket or pockets in the dividing head at each step until the last full charge for the measuring pocket or pockets shall have been discharged from the pressure chamber, at which time only will the travel of the ram be reversed and the pressure chamber filled with a fresh charge of dough.

The invention also provides specific novel actuating mechanism for the ram and for the knife or other valve means which closes the compression chamber off from the supply of dough during the compression stroke of the ram.

Fractional dough dividing machines have been built heretofore which were adjustable to permit measuring small dough pieces of different sizes, but these have had various disadvantages, some structural and others functional, in that they worked the dough undesirably. For example, dough dividers with adjustable measuring pockets have been built in which the ram reciprocated for each dividing operation, being drawn back during each division. Each charge of dough was thereby alternately stretched and compressed repeatedly, being punished so that its texture or its ability to rise during baking, or both, were impaired.

To avoid this punishment other dividers have been provided with means for adjusting the working stroke of the ram whenever the dough piece size was changed, the knife opening with each division, so that a charge sufficient only for one measuring operation was drawn into the ram chamber. While this minimized punishment by the ram, the frequent knife operations caused mechanical wear, avoided by my construction, and necessarily wire-drew and otherwise punished the dough as it entered the ram chamber more than would have been the case had the knife operated less frequently on larger charges. Further, two adjustments, one for the ram stroke, the other for the travel of the pistons in the measuring pockets, had to be made whenever the dough-piece size was changed.

To avoid the above-mentioned disadvantages of earlier dividers a third type of machine was designed in which a full charge in the pressure chamber was kept under pressure continuously while it was divided into small pieces by successive operations of the dividing head. A differential drive mechanism actuating the ram and the division box operated so that when the ram was arrested by the dough, when the measuring pockets were full, the drive moved the division box to its discharging position. Then, when empty measuring pockets were moved into receiving position, the back-pressure against the ram was relieved, and it moved forward again while the division box came to rest. In a machine of this kind the dough was under maximum pressure while the dividing head moved its measuring pockets into or out of register with the pressure chamber. There was therefore a maximum tendency for the dough to be forced between the relatively moving faces of the head and pressure chamber, where it interfered with lubrication and contributed to rapid wear of the surfaces, increasing the working clearances until leakage of dough soon became so excessive as to require reconditioning the machine. Furthermore, when a measuring pocket began to move into register with the compression chamber, the dough under maximum pressure would flow through the initial small opening, shredding it or wire-drawing it excessively.

The present improvement provides an actuating and controlling mechanism for the knife and ram which has none of the above-mentioned disadvantages. After the compression chamber is filled, the ram travels forward until the chamber is substantially emptied, without being drawn backward during operations of the measuring head to stretch the dough undesirably. The pressure on the dough is relieved while the dough in the pocket is being severed from that in the compression chamber, and pressure is not reapplied to the dough mass until an empty measuring pocket is again in register with the compression chamber. Dough is therefore neither forced between the opposed faces of the head and compression chamber while they are in motion nor injected into the pocket through a restricted opening at any time.

My improved apparatus permits a given divider to produce pieces of any desired size, variations being made simply by a single adjustment of the stop mechanism for the piston in the measuring pocket. The invention requires and comprises apparatus which is simple, low in cost, and applicable to existing standard machines built to cut dough pieces of fixed size. A machine according to the invention can, moreover, be adjusted simply to operate conventionally for producing large dough pieces of loaf size.

Certain features of the invention are also applicable to hydraulically driven dividers in which fluid pressure operates the ram.

A further feature of the invention is a novel variable face cam having communicating circular and eccentric tracks, together with switch mechanism for directing the cam follower selectively into one track or the other, the switch mechanism being actuated during rotation of the cam by engaging a movable abutment member which is selectively positioned by any suitable part of the machine with which the cam action is to be co-ordinated. This improved cam, which is claimed in my copending application, Serial No. 397,278, filed June 9, 1941, as a continuation-in-part of this application, has the advantage over drum cams heretofore employed for this general purpose, that it occupies no more space than a conventional face cam, and may be installed in many existing machines having fixed cams with little or no alteration of the machine. Where a drum cam is used the machine frame and drive mechanism ordinarily must be designed especially to accommodate it.

Additional features and advantages will be made apparent in the course of the following specification.

One divider embodying the features of the invention is illustrated in the drawings, in which:

Figs. 8 and 9 are enlarged diagrammatic views of the cam which actuates the knife.

Figure 1:
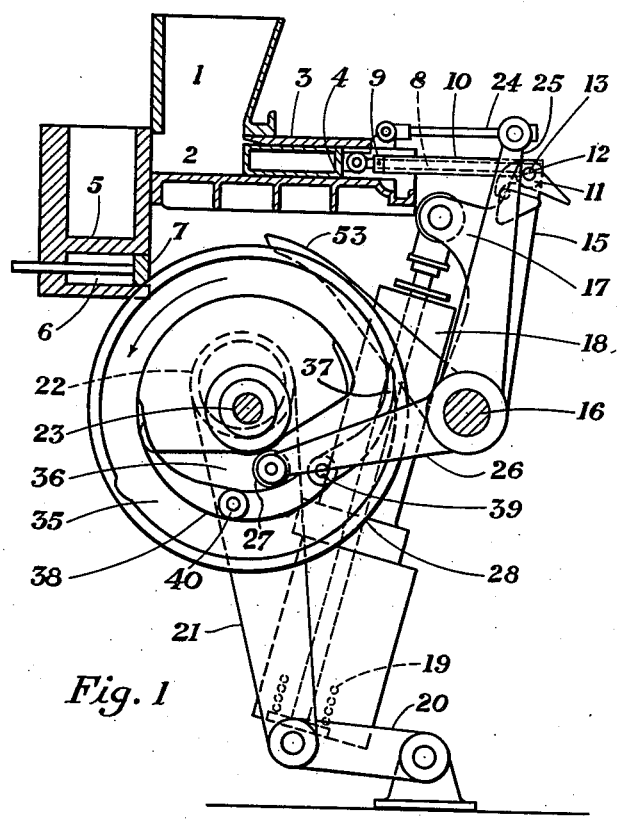
Figs. 1–5 are sectional side elevations showing the working parts in the positions which they assume at various stages in an operating cycle.

In Fig. 1 the invention is shown applied to a standard dough divider having a dough reservoir 1 communicating with a pressure chamber 2 which can be closed off from communication with the hopper by a slidable valve or knife 3. A ram 4 is slidable in the compression chamber 2 to urge dough under pressure into a dividing head 5. The dividing head 5 is vertically reciprocable to move its one or more measuring chambers 6 into and out of register with the pressure chamber. (The machine shown is described and claimed as having one pocket, but it is to be understood that for the purposes of this specification this term embraces also a plurality of pockets.) A plunger 7 is slidable within the measuring chamber 6, being displaced rearwardly in known manner by dough pressed into it by ram 4. When the head is in discharging position out of register with the compression chamber the plunger 7 is moved (to the right in the drawings) to expel its dough piece. The size of the dough piece is determined by the setting of an adjustable stop (not shown) which limits the depth to which the piston may be displaced in the pocket by incoming dough.

Patent No. 1,871,264, to Gustav B. Eggert, issued August 9, 1932, shows and describes mechanism for reciprocating the head 5 in timed relation to the pressure strokes of the ram 4, adjustable stop mechanism for determining the travel of the plunger 7 to produce dough pieces of different sizes, and mechanism for actuating the plunger to discharge the measured dough pieces. These known elements form no part of the present invention and are therefore omitted from the drawings to avoid confusing detail.

Figure 7:
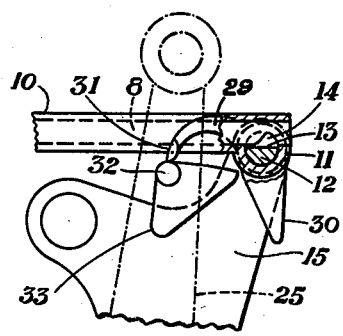
Figs. 6 and 7 show the latching mechanism for coupling the ram to the oscillatory ram-actuating lever.

Referring to Figs. 1 and 7, the ram 4 is actuated by a novel telescopic lost-motion connecting member consisting of a rod 8 carrying a stop 9, preferably a set collar. Rod 8 is slidably received in a tubular sleeve 10 which is the driving member of the assembly. Sleeve 10 is pivotally connected to a ram lever 15, which oscillates in known manner in timed relation to the operations of the dividing head and plunger 7.

Figure 6:
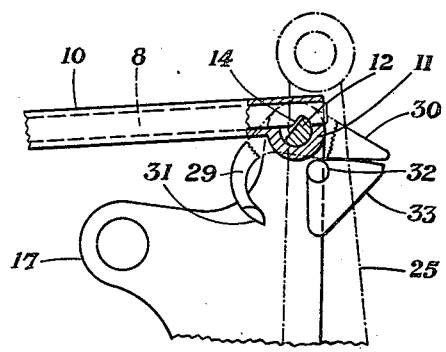

Referring to Figs. 6 and 7, sleeve 10 is provided at its outer end with journals 11 in which a pin 12 is rotatably received. The pin is also journaled in a yoke at the end of the ram lever 15. Pin 12 is flattened, 13 in Fig. 7, at its upper midsection where it underlies the rod 8, and the under side of rod 8 is correspondingly notched at 14. Pin 12 may be turned into engagement with the notch 14 to latch rod 8 and sleeve 10 together so that ram 4 will reciprocate with lever 15, or it may be turned out of engagement with notch 14 so that sleeve 10, reciprocating with lever 15, will slide freely over the rod when lever 15 moves rearwardly. With pin 12 free of notch 14 the ram will be advanced when the sleeve engages stop 9 on its travel to the left, but will remain at rest when the sleeve moves to the right. Specific mechanism for actuating the latch pin at predetermined times will be described below.

Referring again to Fig. 1, the ram lever 15 is pivoted to the machine frame at 16. It has an integral laterally extending arm 17 pivotally connected to a resilient connecting rod 18. Member 18 is elongated under tension against the resistance of a coil spring 19 (see Fig. 1) and is connected to a lever 20 pivoted to the machine frame. Lever 20 in turn is connected by a link 21 to a power-driven crank or eccentric 22 on the main shaft 23 of the machine, driven by a source of power (not shown). The resilient rod 18 permits the ram lever to move through strokes varying with the adjusted volume of pocket 6 while the lever 20 oscillates through a constant arc. This drive mechanism for the ram lever is fully shown and described in Gustav B. Eggert Patent No. 1,871,261, issued August 9, 1932.

The knife 3 is actuated by a connecting rod 24 pivotally connected to a lever 25 which is one arm of a bell-crank journaled at 16 and having another arm 26 carrying a cam roller 27. Cam roller 27 engages and is actuated by a cam 28 fixed to the main drive-shaft 23, oscillating the bell-crank 25, 26 to move the knife 3 to and from its closed position. Cam 28 comprises features which, in co-operation with means associated with the ram drive, cause the knife to be withdrawn from its closed position only when the ram has moved the last complete charge for measuring pocket 6 out of pressure chamber 2 and the dough remaining therein is insufficient to fill pocket 7 completely.

Referring to Figs. 8 and 9, the cam 28, which rotates counter-clockwise, has a circular outer track 35 and an eccentric inner track 36. Track 36 communicates at both ends with the track 35. With the cam follower 27 in the outer track the knife 3 remains closed. When point 37, of two switch points 37, 38, pivoted on the cam, is positioned to direct the follower 27 into the inner track, knife lever 25 is oscillated to withdraw the knife and then advance it to its closed position. The switch points 37 and 38 are fastened to pins 39, 40, respectively, passing through and journaled in the body of the cam 28. Levers 41, 42 are also fixed to pins 39, 40, respectively and are interconnected by mechanism for moving the points, which is next to be described.

For purposes of clarity, in Figs. 8 and 9, the cam body is shown in broken lines, the levers 41, 42, and the switching mechanism being drawn solid, whereas actually the levers are on the opposite face of the cam from the switch points and the cam tracks. Lever 41 of switch point 37 has pivoted to it a rod 43, which passes through the eye of a guide 44 fixed to the cam body. Rod 43 extends slidably through a bushing or sleeve 45 which is pivoted at the end of lever 42 of switch point 38. Beyond the sleeve a collar 46 presents an internal shoulder 47 which engages a shoulder on the rod 43. Collar 46 is slidable upon the reduced end portion of the rod and is urged yieldingly inward by a spring 48 bearing against a washer at the end of the rod.

A latch 49 is pivoted on the cam body, a spring 50 urges the latch normally into engagement with the collar 46, and a roller 51 on the latch is positioned to engage a movable abutment member 53 during rotation of the cam and release the latch.

Figure 5:
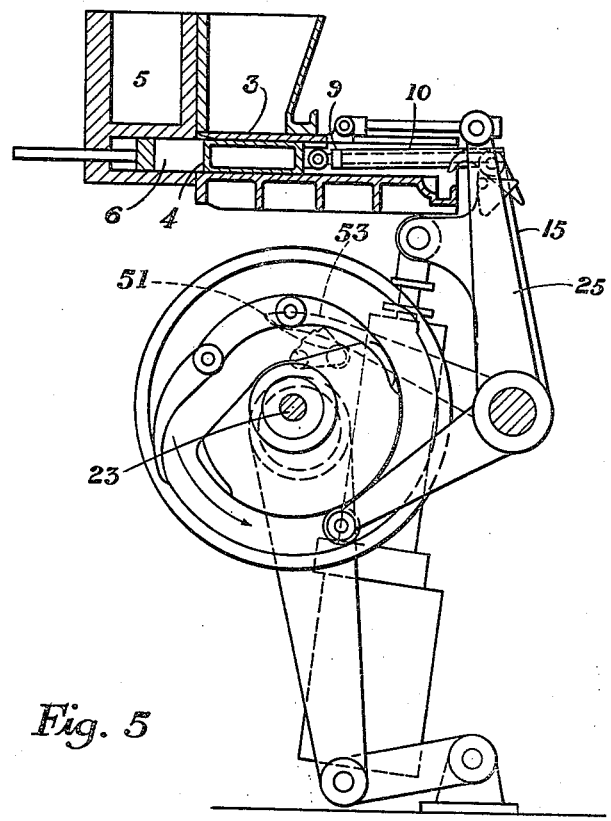

Fig. 9, corresponding to Fig. 5, shows the switch point 37 open to pick up the cam roller 27 and direct it into the inner track 36. The latch 49 is released, and collar 46, lever 42, rod 43, and lever 41 have been moved to the left by the pressure of springs 48 and 52.

Figure 2:
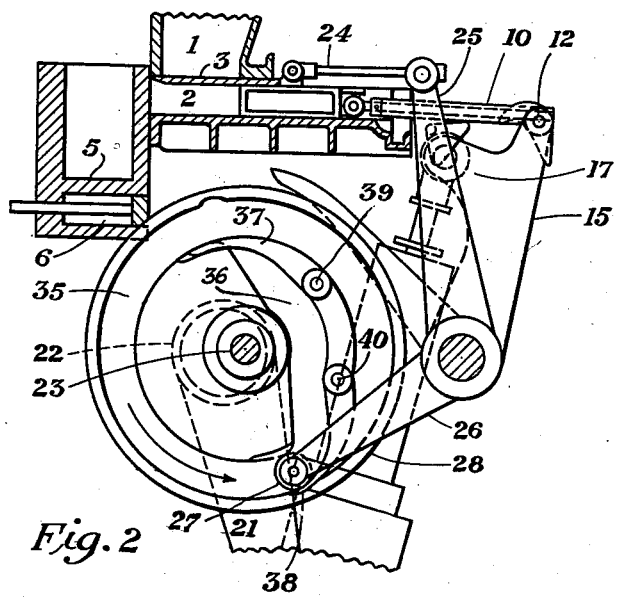

Fig. 8, corresponding to Fig. 2, shows the cam when the roller 27 is leaving the inner cam track 36. As the cam rotates counter-clockwise the roller forces switch point 38 outwardly, moving the switch lever 42 and sleeve 45 down against collar 46. This compresses spring 52 and urges the rod 43 down, drawing the switch point 37 closed and compressing the other spring 48. The spring latch 49 engages collar 46 to hold switch point 37 closed. The cam roller 27 will now follow the circular track 35 and will impart no motion to the knife lever 25 until such time as the roller again enters the eccentric track 36. On the next revolution of the cam, the follower 27 engages the back of switch point 38 and closes it, sleeve 45 sliding up rod 43 (see Fig. 4). On subsequent cam rotations the outer track 35 is unobstructed and operation is noiseless.

To trip the latch 49 and switch the follower 27 into the inner track 36, an abutment lever arm 53 is provided adjustably fixed to the ram lever at its axis 16. (See also Fig. 1.) As the ram reciprocates on successive compression strokes it advances farther into the pressure chamber and the abutment arm 53 swings down farther, each stroke more closely approaching the cam. The arm 53 is indexed relative to the ram lever so that when the ram lever approaches the end of a final stroke, its end moves to the position shown in dotted lines in Figs. 5 and 9, into the path of travel of the roller 51 on the latch 49. When roller 51 engages the abutment arm 53 the latch releases collar 46. The springs 48 and 52 move the rod 43, collar 46, and switch lever arm 41 downward in Fig. 9, opening point 37. The cam follower 27 will now be directed into the inner track 36.

The resultant motion of the knife lever 25 trips a pawl on the ram lever 15 and locks the sleeve and rod of that member together, so that the ram will be withdrawn on the next rearward travel of the ram lever. The mechanism for actuating the latch pin 12 consists of the said pawl (see Figs. 6 and 7) fixed to the pin 12 and presenting a depending hooked finger 29 ahead of the pin and a rearwardly extending finger 30. An abutment pin 32 extending into the path of travel of the pawl is mounted upon a triangular guide block 33 fixed to the knife lever 25. When the knife lever moves from its open position, as in Fig. 1, to close off the compression chamber 2, the abutment pin 32 engages the finger 29 of the pawl, lifting it and turning the pin 12 out of engagement with the notch 14 (see Fig. 7). The lower end of finger 29 also has a laterally extending lug 31, which slides upon the upper edge of the guide block 33, holding the pawl and the pin in their unlatched position. The block 33 is not essential to operation of the pawl, as friction will hold the pawl in any position, but it is provided in the present machine, in order that in certain relative travels of the knife and ram levers, the pawl can not be turned into latching position to cause possible damage to itself, the pin 12, or the notch 14.

When the ram has reached the limit of its travel on a final pressure stroke and the knife-lever 25 is rocked back, abutment pin 32 engages the finger 30 of the pawl, turning latch pin 12 counter-clockwise as in Fig. 6, to fasten sleeve 10 and rod 8 together.

A typical operating cycle of the machine will now be set forth, to interrelate the operations of the several elements just described. Assuming that the travel of the plunger 7 in the measuring pocket 6 has been adjusted so that the charge of dough in the pressure chamber will be used up in two operations of the head, and beginning with Fig. 1, the knife 3 and ram 4 have been withdrawn to fill the pressure chamber 2 with dough from the hopper 1 and the dividing head 5 is in its discharging position. The eccentric 22 and cam 28 have passed their uppermost, or 360° position. The connecting rod 18 is raised and ram lever 15 is rocked to its furthest position to the right. The ram lever 15 and the knife lever 25 are so positioned that the abutment member 32 of the knife lever lies behind the hooked finger 29 of the pawl. The cam follower 27 is midway through the inner cam track 36.

As the main shaft 23 rotates counter-clockwise toward the position of Fig. 2 the cam follower is urged outwardly into the outer track (see Fig. 8) forcing the switch point 38 open. The switch lever 42 and its sleeve 45 move along rod 43, urging the collar 46 into a position where it will be engaged by the spring latch 49. Through springs 48 and 52 the rod 43 is urged endwise and closes the other switch point 37.

The motion of cam follower 27 to the outer track 35 rocks the knife lever 25 forward, or to the left, in Fig. 2, to sever the charge of dough in the compression chamber 2 from the supply in the hopper 1. This motion of the knife lever 25 moves the abutment member 32 on the knife lever under the hooked finger 29 of the pawl, turning the pin 12, as shown in Fig. 7, to disconnect the rod 8 from sleeve 10.

Figure 3:
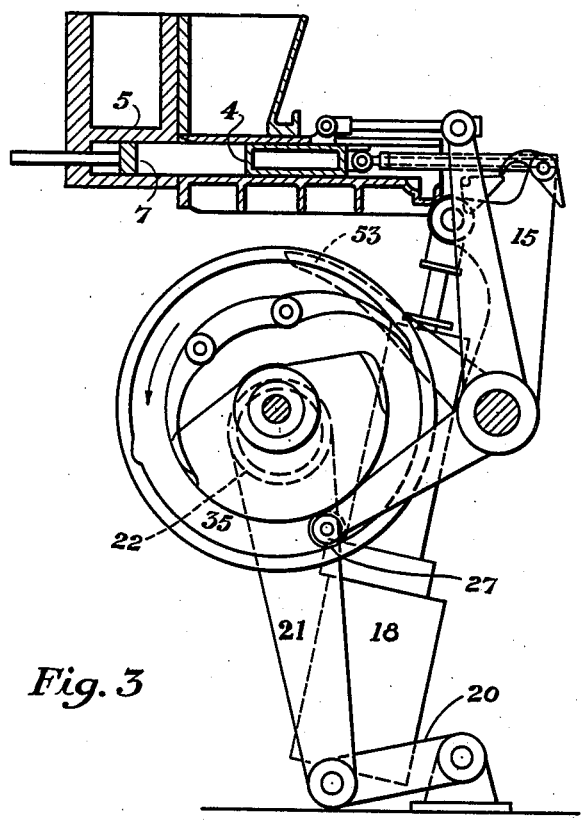

Referring to Fig. 3, continued rotation of the drive-shaft 23 has moved the dividing head 5 into its receiving position. Corresponding rotation of the eccentric 22 through the power transmitting linkage 20 and 21 has drawn the extensible connecting rod 18 down and rocked the ram lever 15 part way to the left. The plunger 7 of the dividing head has been arrested by its adjustable stop means (not shown), the compressed dough has stopped the ram 4 and extension of the resilient connecting rod 18 has taken up the remaining travel of the eccentric 22 and the lever arm 20. The cam tripping arm 53 has been rocked down to the position shown. Cam roller 27 is in the circular track 35, so the knife 4 remains closed.

Figure 4:
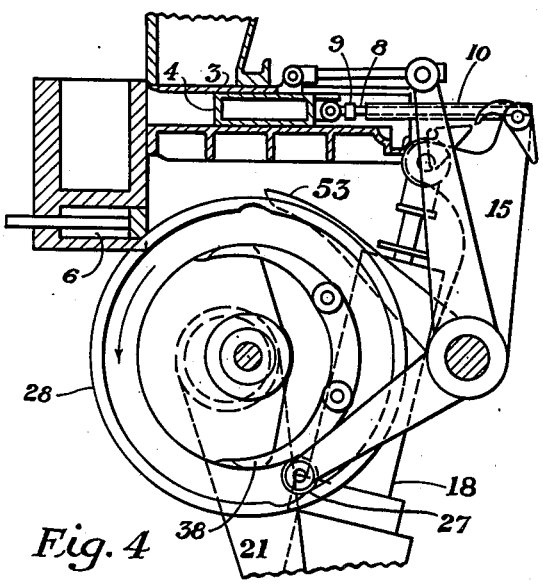

Fig. 4 shows the position of the parts at the next half revolution. The head is again in its discharging position and the dough pieces have been discharged. The ram lever 15 has been rocked back to the right. The rod 8 and the sleeve 10 of the ram connection being disengaged, the sleeve has slid over the rod away from stop 9. Because of this lost motion the ram 4 has not been withdrawn with the ram lever arm 15 but the pressure on the dough has been relieved before the measuring head moved the pocket 6 out of register with the mouth of the pressure chamber. The cam 28 has rotated to carry switch point 38 past the follower 27. The follower engaging the outside of the switch point has moved it to the closed position shown. Cam follower 27 being in the outer track, the knife 4 has not been withdrawn.

Subsequent rotation of the eccentric to the position of Fig. 5 has moved the ram lever arm 15 again to the left, causing the sleeve 10 to engage against stop 9 and push the ram 4 to the left, again filling the measuring pocket 6. The same rotation of the main shaft 23 effected the return of the measuring head 5 to its receiving position. Because of the reduced quantity of dough in the compression chamber the ram has advanced to the limit of its travel, as has the ram lever 15. As the ram approached the limit of its travel the cam abutment lever 53 was carried into the path of travel of the roller 51. Referring to Fig. 9, the roller has engaged the trip member 53, rocking the latch 49 against the pressure of the spring 50 and disengaging the latch from collar 46. The pressure of springs 48 and 52 has moved the rod 43 to the left in Fig. 9, urging lever 41 clockwise and opening the switch point 37. Continued rotation of the cam during the discharge travel of the head will cause the follower 27 to enter the inner cam track 36, rocking the knife lever 25 to the right to withdraw the knife 4.

Referring to Fig. 6, withdrawal of the knife causes the abutment 32 on knife lever 25 to engage the finger 30 of the pawl, turning pin 12 and again locking the rod 8 and the sleeve 10 together. The immediately following return stroke of the ram lever 15 will therefore withdraw the ram and the head 5 will move to discharge position, restoring the machine parts to the position in Fig. 1.

In the above described operating cycle, the stop means for the measuring plunger has been assumed to be set so that the ram performs two pressure strokes for each filling of the pressure chamber. The stop, however, may be adjusted to produce smaller dough pieces of any desired size so that any number of pressure strokes may occur before the ram lever reaches the limit of its travel and the latch-engaging arm 53 reaches a position where it will be engaged by the latch 51 to switch the cam follower 27 through the eccentric track and open the knife for a fresh charge. This control of the knife and ram withdrawals is entirely automatic, the only adjustment required when changing sizes being to set the measuring plunger stop appropriately.

This construction is particularly adapted to dividers using the ram actuating mechanism shown. Regardless of the amount of dough in the pressure chamber the ram advances each pressure stroke only until a predetermined pressure is exerted upon the dough, the remaining travel of the ram eccentric 23 being taken up by stretching the elastic connecting member 18. Also, only when the ram lever reaches the limit of its travel and the knife is withdrawn will the latch pawl be tripped to withdraw the ram. For any charge of dough, therefore, regardless of the number of pressure strokes, there is only one opening of the knife and one withdrawal of the ram for each charge of dough regardless of the number of pieces into which it is divided. Furthermore, the movement of the measuring head and the withdrawal of the ram lever are so indexed with relation to the rotation of the main shaft 22 that mechanical pressure on the ram is relieved before movement of the dividing head begins. Repeated working, stretching, or extruding of the dough in the narrow opening is avoided and equally compressed dough pieces of uniform quality, due to avoidance of all unnecessary punishing, are produced.

The machine can quickly be adjusted to produce small dough pieces of any desired size, from the full capacity of the measuring pocket to the small finger roll. Its action upon dough pieces of different sizes is uniform, so that uniform response to given baking conditions is assured. It can also be used to produce large loaves, eliminating the need in many bakeries for a separate loaf divider. The arm 53 is simply adjusted upward relative to ram lever 15 so that it will not trip the cam latch 49. The knife and ram will then reciprocate through a full cycle with each rotation of the main shaft 23 and dividing operation of the measuring head, in the manner of the conventional divider shown in the Eggert patents referred to.

It is to be understood that the form of my invention shown and described is but one example of the same, and that changes in the specific form and arrangements of parts may be resorted to without departing from the scope of the claims. The invention is, for instance, applicable to a divider having a rotary drum-type measuring head, instead of the reciprocating head shown. The face cam shown may be replaced by a barrel cam of known kind having alternative tracks and a follower with means for selectively directing it into one track or the other. Other known mechanical expedients for withdrawing the ram only when it has advanced to a predetermined position may also be adopted, within the scope of the invention.

Having thus described my invention, what I claim and desire to secure by Letters Patent is:

1. In a dough divider having a pressure chamber, a ram slidable therein, a knife slidable between the dough reservoir and the pressure chamber, and knife-actuating means comprising a bell-crank having two arms, one arm of which is pivotally connected to said knife, the other arm of which carries a cam follower, in combination, a power-driven cam rotatable in timed relation to the operation of the ram having alternative cam tracks in which said cam follower engages, one of said tracks being concentric with the cam axis so that no displacement of the knife occurs when the follower is in said track, the other track being eccentric and indexed to reciprocate said knife to and from open position during a rotation of said cam.

switch means on said cam for deflecting said cam follower from one track to the other, and a movable switch-operating element indexed to the position of said ram so that whenever said ram reaches a predetermined limit of forward travel the switch means is actuated to divert said follower from the concentric track to the knife-actuating track, causing withdrawal of the knife to admit a charge of dough to said pressure chamber during the rearward travel of said ram.

2. A dough divider as claimed in claim 1 wherein the ram-actuating mechanism consists of a rocker-arm resiliently connected to a crank element rotatable in timed relation to said cam means and operable to urge the ram forward on each rotation of said crank element to a position determined by the compression of the dough charge when the measuring pocket is filled, moving the ram to a successively advanced position on each pressure stroke until the last complete charge of dough has been urged into the measuring pocket, the switch-means on the cam comprising an abutment, and the switch-operating element consisting of a lever arm fixed to and movable with said ram rock-shaft, so indexed with respect to it that when the ram advances to the said predetermined forward limit of its travel the lever arm moves into position for engagement with said abutment on said cam to actuate said switch and shift the cam follower into the eccentric knife-actuating track.

3. In a dough divider having a pressure chamber, a ram slidable therein, a dough supply reservoir, valve means for closing off said chamber from said reservoir, a dividing head with a measuring pocket movable in timed relation with the pressure strokes of the ram alternately into dough-receiving communication with said pressure chamber and out of register therewith into discharging position, in combination, reciprocating ram-actuating means arranged and operable to advance the ram step-by-step by successive forward strokes to urge dough into the measuring pocket and relieve the ram pressure after each stroke, and automatic means operable only when the ram has been advanced to its limit of travel to couple the ram and ram-actuating means for retraction of the ram on the next rearward stroke of the ram-actuating means and then to uncouple the ram so that the succeeding rearward strokes of the ram-actuating means do not move the ram rearwardly until it again has been advanced to the limit of its travel.

4. In apparatus as claimed in claim 3 wherein the valve means consists of a knife slidable between the pressure chamber and the supply reservoir, actuating means therefor comprising an oscillatory lever mounted for movement adjacent the path of travel of the ram-actuating means, abutment means positioned on said knife lever, and releasable latch means for coupling the ram-actuating means to the ram for withdrawal of the latter carried by said ram-actuating means, said releasable latch means and said abutment means being positioned and operable for mutual engagement adjacent their forward and rearward limits of travel to latch the latch means when the ram approaches its forward limit of travel and to release it to uncouple the ram when the ram and knife have been withdrawn and the knife lever starts forward to move the knife to its closed position.

5. In a dough divider having a pressure chamber, a ram slidable therein, a dough supply reservoir, valve means for closing off said chamber from said reservoir, a dividing head with a measuring pocket movable in timed relation with the pressure strokes of the ram alternately into dough-receiving communication with said pressure chamber and out of register therewith into discharging position, in combination, ram-actuating means operable in successive pressure strokes to advance the ram step-by-step to urge dough into the measuring pocket, interrupting its pressure between strokes, and automatic releasable means operable only when the ram has been advanced to a predetermined limit of travel to retract the ram and draw a fresh charge of dough into the pressure chamber.

6. Apparatus as claimed in claim 5 wherein the ram-actuating mechanism consists of a power-driven element reciprocatory in the direction of travel of the ram, a connecting rod and abutment on the ram, means on the reciprocating element to engage said abutment at each forward stroke to advance the ram, releasable means on said reciprocatory element to engage said connecting rod on the forward stroke to withdraw the ram, means operable only when the ram approaches a predetermined limit of its forward travel to cause said releasable means to engage said connecting rod for withdrawal of the ram and means operable to disconnect said releasable means from said connecting rod when the ram is at its rearward limit of travel.

7. In a dough divider having a pressure chamber, a ram slidable therein, a dough supply reservoir, valve means for closing off said chamber from the dough supply, a dividing head with a measuring pocket movable alternately into and out of communication with the pressure chamber, and means for discharging dough pieces from said measuring pocket, in combination, actuating means operable to move the ram forward periodically in the pressure chamber step-by-step to urge a charge of dough into the measuring pocket and actuater in timed relation to the operation of said dividing head to relieve the pressure on the dough before said measuring pocket starts to move out of register with said pressure chamber, means operable only when the ram has been moved on its last stroke to the limit of its forward travel to open said valve means between the pressure chamber and the dough supply, and means controlled in accordance with the position of said valve-opening means to withdraw the ram from the pressure chamber only after the valve has begun to open.

HENRY DEVLIN.